UNITED STATES PATENT OFFICE.

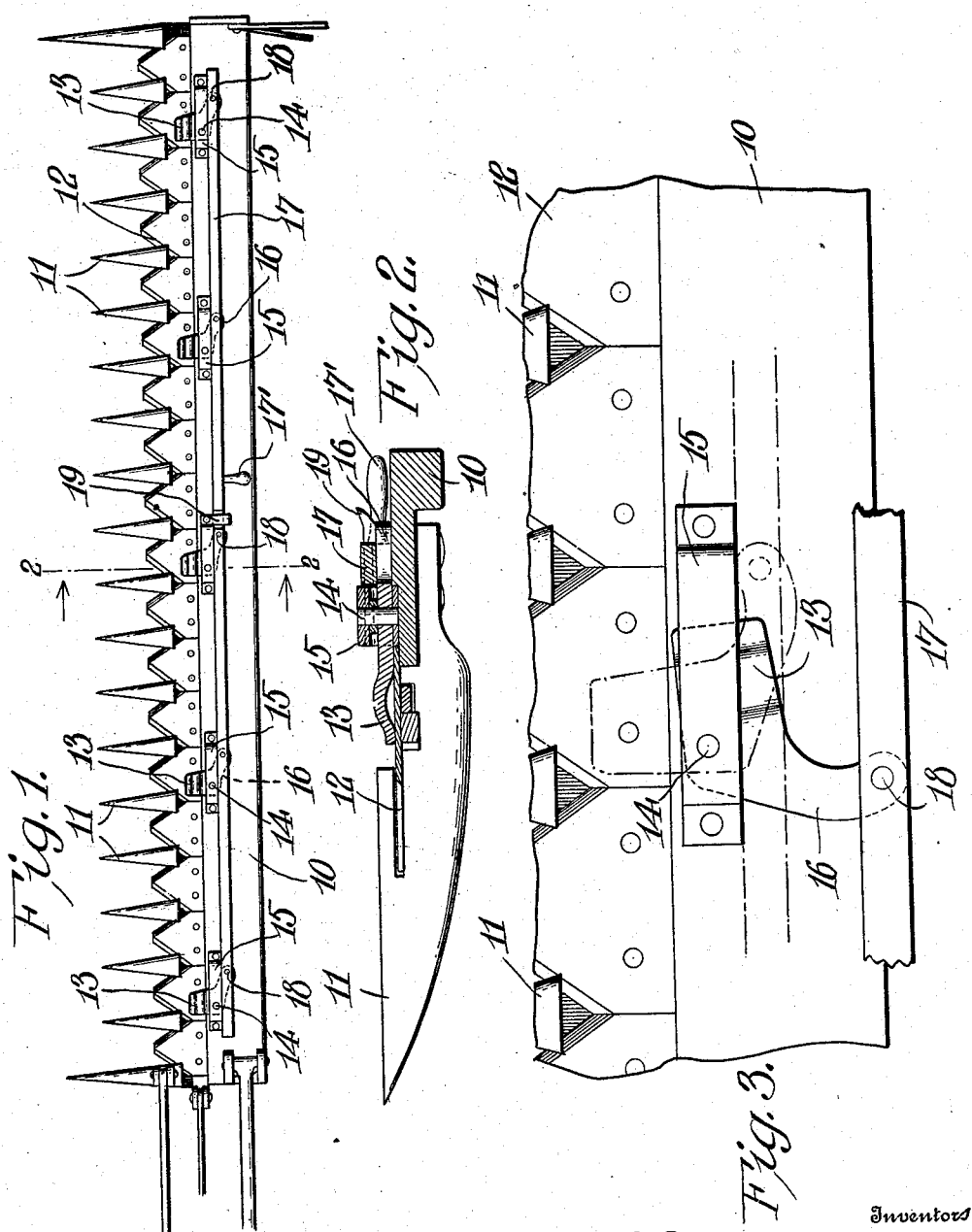

JAMES McDERMOTT AND JOHN YANZICK, JR., OF SPEARFISH, SOUTH DAKOTA.

SICKLE-BAR ATTACHMENT.

No. 911,322. Specification of Letters Patent. Patented Feb. 2, 1909.

Application filed May 29, 1908. Serial No. 435,718.

*To all whom it may concern:*

Be it known that we, JAMES McDERMOTT and JOHN YANZICK, Jr., citizens of the United States, residing at Spearfish, in the county of Lawrence and State of South Dakota, have invented certain new and useful Improvements in Sickle-Bar Attachments, of which the following is a specification.

This invention relates to harvesting machinery, and especially to reaper or mower cutting apparatus, and preferably the latter.

The primary object of the invention is to provide a means whereby the sickle may be readily applied to or removed from the sickle bar, such operation being effected by a simple bodily movement of the sickle, as distinguished from the longitudinal movement now commonly employed. In many types of mowers it is necessary for the operator to crawl or at least reach in front of the sickle or beneath the machine, whereby he is exposed to great danger of loss of life or limb. In fact in some instances, when a spirited team is employed in connection with the machine it is necessary to first unhitch the team in order that the operator may safely manipulate his machine.

For a full understanding of the invention, including its construction and characteristic advantages, reference is to be had to the following detail description and the accompanying drawings, in which—

Figure 1 is a plan view of a sickle bar and sickle provided with the improved securing means complete; Fig. 2 is a cross sectional detail on the line 2—2 of Fig. 1, and Fig. 3 is an enlarged detail of one of the pivoted keepers, showing the same open in full lines and closed in dotted lines.

Throughout the following detail description and on the several figures of the drawings similar parts are referred to by like reference characters.

Referring specifically to the drawings there is indicated at 10 a diagrammatic representation of a sickle bar provided with the usual guards 11, and in connection with which is a sickle 12. It will be understood that these parts are or may be of any approved type, and *per se* constitute no part of our present invention.

The usual method of introducing a sickle into its place consists in sliding the same longitudinally from one end of the sickle bar, an operation which is not only dangerous from the position which the operator must assume, but one which is often times difficult to perform by reason of the accumulations or gumming on the guards and sickle bar.

In place of the usual keepers rigidly secured to the upper surface of the sickle bar for the purpose of preventing upward displacement of the sickle, we employ a series of movable keepers 13. Such keepers may be mounted in any suitable manner, and may be withdrawn out of the way of the sickle by any suitable means, in order to accomplish the result aimed at in this invention. As set forth herein each of the keepers 13 is pivoted as at 14 in a bracket 15 rigidly attached to the upper surface of the sickle bar. As noted the pivot 14 is disposed near one side or margin of the keeper 13. Extending rearwardly from the keeper is an arm 16, whereby the keeper may be swung upon its pivot 14 so as to be thrown entirely out of the way of the sickle, as indicated in the drawings. The bracket 15 it will be understood is provided with a space long enough to accommodate said swinging movement of the keeper. As a convenient illustration of means for operating said keepers we have shown a connector 17, in the form of a rigid bar, which is pivotally attached as at 18 to each of the arms 16, and whereby a single simple operation of the connector will move all of the keepers simultaneously. The connector 17 may be provided with a suitable handle or finger piece 17, whereby the same may be the easier manipulated. When the keepers are thus thrown out of normal position, the sickle, after being detached from its driving mechanism, may be bodily lifted out of place, as will be appreciated. Such operation may be performed from behind the sickle bar by the use of only one hand. Upon replacing the sickle the keepers will all be thrown into normal position in coöperation with the sickle by a reverse movement of the connector, and the keepers may be secured in such normal position by any suitable means. The means herein set forth consists in the use of a spring catch 19 so disposed as to receive the connector, holding it at its extreme forward position.

Having thus described the invention, what is claimed as new, is:

1. In cutting apparatus for mowers and the like, the combination of a sickle bar, guards secured thereto, a sickle coöperating with said guards and bar, and a series of keepers coöperating with said sickle to normally hold the same from displacement, such keepers being movable out of coöperation with the sickle whereby the sickle may be removed from the sickle bar by outward bodily movement.

2. In cutting apparatus for mowers and the like, the combination of a sickle bar, guards secured thereto, a sickle coöperating with said guards and bar, a series of pivoted keepers coöperating with said sickle to normally hold it in place within the guards, and means for swinging said keepers on their pivots, whereby the sickle may be introduced or removed by a simple bodily movement.

3. In combination with a sickle bar having the usual guards and a sickle coöperating therewith, a series of movable keepers attached to said sickle bar and coöperating with the sickle to hold the same from upward displacement, and means connected to all of said keepers whereby they may be simultaneously operated.

4. In combination with a sickle bar having the usual guards and a sickle coöperating therewith, a series of movable keepers attached to said sickle bar and coöperating with the sickle to hold the same from upward displacement, means connected to all of said keepers whereby they may be simultaneously operated, and means coöperating with said connecting means to secure the same with the keepers in normal position.

In testimony whereof we affix our signatures in presence of two witnesses.

JAMES McDERMOTT.
JOHN YANZICK, Jr.

Witnesses:
 ERNEST WILSON,
 R. H. DEMMON.